(12) United States Patent
Oda et al.

(10) Patent No.: US 11,394,031 B2
(45) Date of Patent: Jul. 19, 2022

(54) FOIL FOR SECONDARY BATTERY NEGATIVE ELECTRODE COLLECTOR

(71) Applicant: HITACHI METALS, LTD., Tokyo (JP)

(72) Inventors: Yoshimitsu Oda, Osaka (JP); Ryoji Inoue, Osaka (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 17/291,018

(22) PCT Filed: Nov. 14, 2019

(86) PCT No.: PCT/JP2019/044723
§ 371 (c)(1),
(2) Date: May 4, 2021

(87) PCT Pub. No.: WO2021/095203
PCT Pub. Date: May 20, 2021

(65) Prior Publication Data
US 2022/0052348 A1 Feb. 17, 2022

(51) Int. Cl.
*H01M 4/66* (2006.01)
*B23K 20/227* (2006.01)
(Continued)

(52) U.S. Cl.
CPC .......... *H01M 4/667* (2013.01); *B23K 20/227* (2013.01); *B32B 15/015* (2013.01); *C25D 3/38* (2013.01); *C25D 5/50* (2013.01); *C25D 7/0621* (2013.01); *H01M 4/661* (2013.01); *H01M 4/669* (2013.01); *B23K 20/04* (2013.01); *B23K 2103/22* (2018.08); *C22C 38/40* (2013.01); *H01M 10/0525* (2013.01); *H01M 2004/027* (2013.01)

(58) Field of Classification Search
CPC ...... H01M 4/661; H01M 4/667; H01M 4/669; B23K 20/227; C25D 3/38
See application file for complete search history.

(56) References Cited

U.S. PATENT DOCUMENTS 6,692,863 B1 2/2004 Nakanishi et al.
6,730,438 B2 5/2004 Nakanishi et al.
(Continued)

FOREIGN PATENT DOCUMENTS

CN 1534819 A 10/2004
EP 1076371 B1 10/2011
(Continued)

OTHER PUBLICATIONS

Nippon Yakin Kogyo Co., Ltd., NAS 630 (UNS S17400) NAS High Strength Stainless Steel, Jul. 26, 2013 (Year: 2013).*
(Continued)

*Primary Examiner* — Stephan J Essex
(74) *Attorney, Agent, or Firm* — Millen White Zelano and Branigan, PC; Csaba Henter

(57) ABSTRACT

This foil for a secondary battery negative electrode collector (negative electrode-collecting foil 5b) includes a first Cu layer (51) made of Cu or a Cu-based alloy, a stainless steel layer (52), and a second Cu layer (53) made of Cu or a Cu-based alloy, which are disposed in this order, a total thickness is 200 μm or less, and 0.01% proof stress is 500 MPa or more.

20 Claims, 4 Drawing Sheets

(51) Int. Cl.
  *B32B 15/01*    (2006.01)
  *C25D 3/38*     (2006.01)
  *C25D 5/50*     (2006.01)
  *C25D 7/06*     (2006.01)
  *B23K 103/22*   (2006.01)
  *B23K 20/04*    (2006.01)
  *C22C 38/40*    (2006.01)
  *H01M 10/0525*  (2010.01)
  *H01M 4/02*     (2006.01)

(56) References Cited

U.S. PATENT DOCUMENTS

| | | |
|---|---|---|
| 6,899,973 B2 | 5/2005 | Nakanishi et al. |
| 6,995,333 B2 | 2/2006 | Nakanishi et al. |
| 10,868,310 B2 | 12/2020 | Oda et al. |
| 2013/0130119 A1 | 5/2013 | Majima et al. |
| 2016/0190598 A1 | 6/2016 | Majima et al. |
| 2019/0106800 A1 | 4/2019 | Nishida et al. |
| 2019/0363367 A1 | 11/2019 | Oda et al. |

FOREIGN PATENT DOCUMENTS

| | | | |
|---|---|---|---|
| EP | 3438331 A1 | 2/2019 | |
| JP | 54124233 A | 9/1979 | |
| JP | 2012-33470 A | 2/2012 | |
| JP | 5306549 B2 | 10/2013 | |
| JP | 5329290 B2 | 10/2013 | |
| JP | 5726216 B2 | 5/2015 | |
| JP | 5726217 B2 | 5/2015 | |
| JP | 2015-164739 A | 9/2015 | |
| JP | 2017160491 A | 9/2017 | |
| JP | 2019-19403 A | 2/2019 | |
| JP | 2019-32966 A | 2/2019 | |
| KR | 20190033642 A | 3/2019 | |
| WO | WO-2018168468 A1 * | 9/2018 | ............ C23C 30/00 |

OTHER PUBLICATIONS

Daido Steel "Stainless Steel Chemical Composition" (1 page) Author: unknown Date: 2005 Retrieved from the Internet: URL:http://www.daido.co.jp/en/products/sta inless/sus jis.pdf [retrieved-on Dec. 1, 2017].

Extended European Search Report dated Oct. 4, 2021 issued in counterpart European patent application No. 19949542.5. (pp. 1-10).

Notice of Final Rejection dated Oct. 5, 2021 issued in counterpart Korean patent application No. 10-2021-7010291. (pp. 1-4) (and English translation thereof pp. 1-4)).

First Office Action dated Sep. 13, 2021 issued in counterpart Chinese patent application No. 201980078218 X. (pages 1-4) (and English translation thereof—pp. 1-6).

International Search Report dated Jan. 28, 2020 issued in corresponding PCT/JP2019/044723 application (3 pages).

English Machine Translation of JP 2019-032966 A published Feb. 28, 2019.

English Machine Translation of JP 2015-164739 A published Sep. 17, 2015.

English Machine Translation of JP 2019-019403 A published Feb. 7, 2019.

English Machine Translation of JP 5329290 B2 published Oct. 30, 2013.

Notification of Reason for Refusal in corresponding KR appln. 10-2021-7010291 dated Jul. 1, 2021 (pp. 1-7).

* cited by examiner

FOIL FOR SECONDARY BATTERY NEGATIVE ELECTRODE COLLECTOR

TECHNICAL FIELD

The present invention relates to a foil for a secondary battery negative electrode collector. In particular, the present invention relates to a foil for a negative electrode collector used in a high-capacity battery.

BACKGROUND ART

In the related art, a foil for a negative electrode collector including copper coating layers on both surfaces of stainless steel is known. Such foils for a negative electrode collector are disclosed in, for example, Japanese Patent No. 5726216 and Japanese Patent No. 5726217.

The foil for a negative electrode collector disclosed in Japanese Patent No. 5726216, Cu coating layers are formed on both surfaces of a stainless steel core material containing 6.0% to 28.0% of Ni. A carbon-based material is used as a negative electrode active material.

In addition, the foil for a negative electrode collector disclosed in Japanese Patent No. 5726217, Cu coating layers are formed on both surfaces of a stainless steel core material containing 0% to 0.6% of Ni. A carbon-based material is used as a negative electrode active material.

CITATION LIST

Patent Literature

[PTL 1] Japanese Patent No. 5726216
[PTL 2] Japanese Patent No. 5726217

SUMMARY OF INVENTION

Technical Problem

Here, although not described in Japanese Patent No. 5726216 and Japanese Patent No. 5726217, in a case where a capacity of a battery becomes higher, an alloy-based material containing Si, Sn, and the like is used as the negative electrode active material instead of the carbon-based material. In the case of such a high-capacity battery, it is known that a volume change due to charging and discharging of the negative electrode active material is large. As the volume change of the negative electrode active material increases, a stress applied to a negative electrode collector increases accordingly. Therefore, the foil for a negative electrode collector used in the high-capacity battery is made of stainless steel having a high proof stress (yield point) having a high Ni content as described in Japanese Patent No. 5726216.

However, since stainless steel with a high Ni content is expensive, a foil for a negative electrode collector desired by the market can be provided in a case where a sufficient proof stress (yield point) can be obtained by using stainless steel with a low Ni content as a core material.

Therefore, the present inventor of the present application has examined the use of stainless steel with a low Ni content as the core material. However, in a case where stainless steel (Ni of 0 to 0.6%) with a low Ni content or stainless steel without Ni as described in Japanese Patent No. 5726217 is used as the core material, there is a problem that the proof stress (yield point) decreases, the stress generated by the volume change of the negative electrode collector exceeds a threshold limit value so that plastic deformation occurs, and therefore wrinkle-like deformation occurs on the foil for a negative electrode collector.

The present invention has been made to solve the above described problem in the foil for a secondary battery negative electrode collector, and an object of the present invention is to provide a foil for a secondary battery negative electrode collector capable of using a negative electrode collector of a high-capacity battery by suppressing an occurrence of wrinkle-like deformation on the negative electrode collector while reducing a Ni content contained in stainless steel for a core material of the foil for a negative electrode collector.

Solution to Problem

As a result of carrying out various experiments and studies, it is possible to produce a foil for a negative electrode collector including a first Cu layer made of Cu or a Cu-based alloy, a stainless steel layer made of stainless steel containing Ni of more than 0.6% by mass and 3.0% by mass or less, in which a ferrite phase and a martensite phase are present, and a second Cu layer made of Cu or a Cu-based alloy, which are disposed in this order, so that the foil for a secondary battery negative electrode collector can have a sufficient proof stress due to the martensite phase being present. Then, the present invention has been completed.

That is, a foil for a secondary battery negative electrode collector according to an aspect of the present invention includes a first Cu layer made of Cu or a Cu-based alloy, a stainless steel layer made of stainless steel containing Ni of more than 0.6% by mass and 3.0% by mass or less, in which a ferrite phase and a martensite phase are present, and a second Cu layer made of Cu or a Cu-based alloy, which are disposed in this order, and a total thickness is 200 μm or less (still more preferably 20 μm or less) and a 0.01% proof stress is 500 MPa or more.

As described above, the foil for a secondary battery negative electrode collector according to the aspect of the present invention incudes the stainless steel layer made of stainless steel containing Ni of more than 0.6% by mass and 3.0% by mass or less, in which the ferrite phase and the martensite phase are present. The foil for a negative electrode collector uses the stainless steel layer in which the ferrite phase and the martensite phase are present as a core material, the first Cu layer and the second Cu layer are disposed on both sides thereof, and the 0.01% proof stress is 500 MPa or more. With this configuration, even in a case where a stress applied to the foil for a negative electrode collector increases, plastic deformation of the negative electrode collector can be suppressed due to the core material that has a sufficient proof stress while the Ni content contained in the stainless steel constituting the core material of the foil for a negative electrode collector is reduced. Therefore, even in a case where the stress is repeatedly applied due to expansion and contraction of a negative electrode active material accompanied by charging and discharging, an occurrence of wrinkle-like deformation on the negative electrode collector can be suppressed while the Ni content contained in the stainless steel constituting the core material of the foil for a negative electrode collector is reduced. As a result, the foil for a negative electrode collector of the present invention can be applied to a negative electrode collector of a high-capacity battery for which an alloy material such as Si or Sn is used as the negative electrode active material.

In the foil for a secondary battery negative electrode collector according to the aspect of the present invention, a tensile strength is preferably 800 MPa or more. With this configuration, even in a case where the stress that is applied due to a volume change caused by charging and discharging of the negative electrode active material is large, it is possible to suppress the rupture of the foil for a negative electrode collector. With the synergistic effect caused by a large 0.01% proof stress as described above, the foil can reliably endure the stress due to the volume change of the negative electrode active material, which is caused by charging and discharging in a case where an alloy-based material having a large charging and discharging capacity is used for the negative electrode active material. As a result, since the core material has a sufficient proof stress and a tensile strength while the Ni content contained in the stainless steel constituting the core material of the foil for a negative electrode collector is reduced, the occurrence of the wrinkle-like deformation on the negative electrode collector can be reliably suppressed.

In the foil for a secondary battery negative electrode collector according to the aspect of the present invention, an electrical resistivity is preferably 7.5 μΩ·cm or less, and more preferably 6 μΩ·cm. With this configuration, since the electrical resistivity is small, it is possible to provide the foil for a negative electrode collector having a large conductivity.

In the foil for a secondary battery negative electrode collector according to the aspect of the present invention, the stainless steel layer preferably contains Cr of 10.5% by mass or more and 20% by mass or less and C of 0.3% by mass or less, more preferably, the stainless steel layer contains Cr of 15% by mass or more and 18% by mass or less and C of 0.01% by mass or more and 0.2% by mass or less, and even more preferably, the stainless steel layer contains Ni of 1.5% by mass or more and 2.5% by mass or less. With this configuration, since a Cr content contained in the stainless steel layer constituting the core material of the foil for a negative electrode collector is large, corrosion resistance of the core material of the foil for a negative electrode collector can be improved. In addition, with such a composition, a two-phase structure constituted of the ferrite phase and the martensite phase can be obtained by heat treatment since the stainless steel constituting the core material of the foil for a negative electrode collector is martensitic stainless steel. As a result, it is possible to finely control a crystal grain size of stainless steel.

In the foil for a secondary battery negative electrode collector according to the aspect of the present invention, a 0.01% proof stress is preferably 550 MPa or more. With this configuration, even in a case where the stress is repeatedly applied due to expansion and contraction of a negative electrode active material accompanied by charging and discharging, an occurrence of wrinkle-like deformation on the negative electrode collector can be reliably suppressed.

The foil for a secondary battery negative electrode collector according to the aspect of the present invention is preferably formed of a clad material constituted by the first Cu layer, the stainless steel layer, and the second Cu layer being laminated and diffusion-bonded in this order. With this configuration, it is possible to provide the foil for a negative electrode collector that is formed such that the first Cu layer, the second Cu layer, and the stainless steel layer are bonded to each other with a strong adhesive force by diffusion-bonding, and that has a thickness of 200 μm or less (still more preferably 20 μm or less) and sufficient conductivity.

In the foil for a secondary battery negative electrode collector according to the aspect of the present invention, each of the first Cu layer and the second Cu layer is preferably a plated layer. With this configuration, since a thickness of each of the first Cu layer and the second Cu layer can be easily reduced, it is possible to easily form the foil for a secondary battery negative electrode collector having a thickness of 200 μm or less (still more preferably 20 μm or less) and sufficient conductivity.

Advantageous Effects of Invention

According to the present invention, it is possible to provide the foil for a secondary battery negative electrode collector capable of suppressing an occurrence of wrinkle-like deformation on the negative electrode collector while the Ni content contained in the stainless steel for the core material of the foil for a negative electrode collector is reduced and capable of using the negative electrode collector of a high-capacity battery.

DESCRIPTION OF EMBODIMENTS

First Embodiment

First, a structure of a battery 100 using a negative electrode-collecting foil 5b according to a first embodiment of the present invention will be described with reference to FIGS. 1 and 2.

(Battery Structure)

Figure 1:
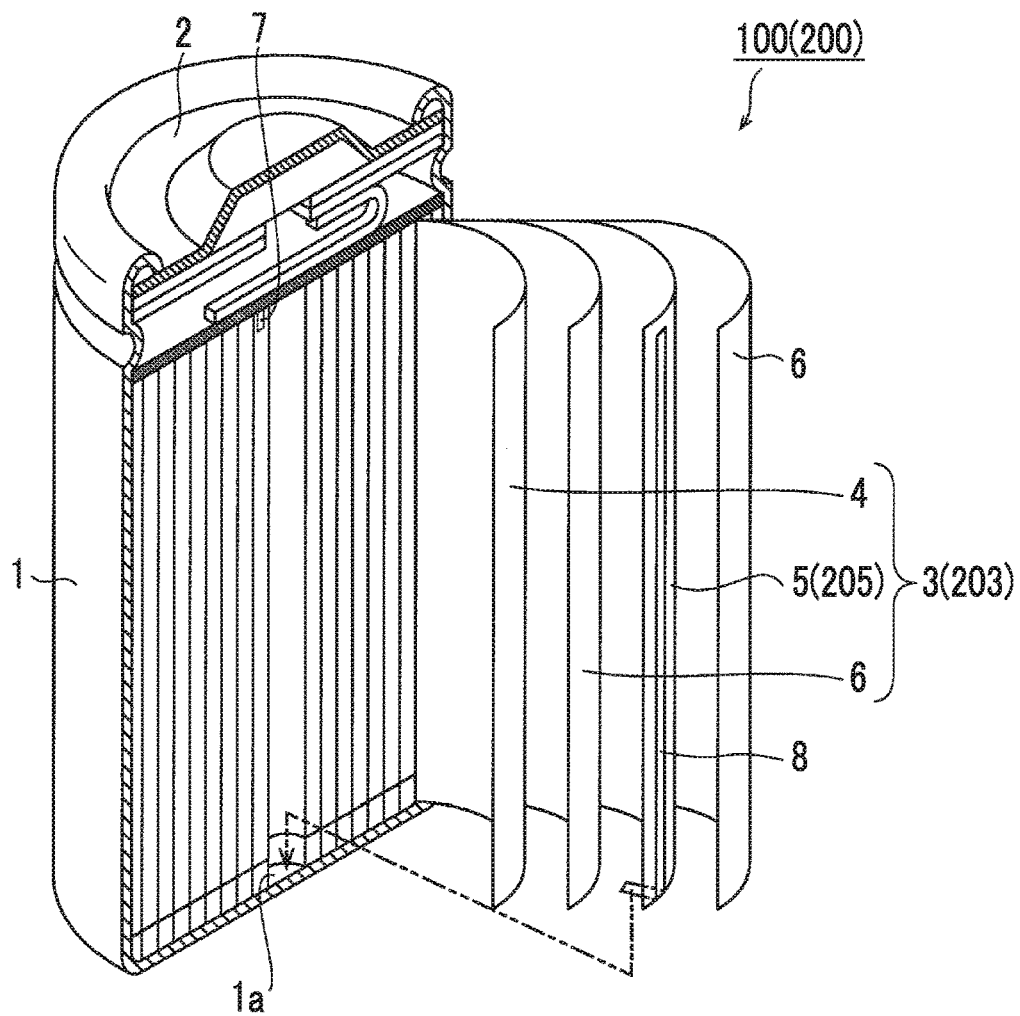
FIG. 1 is a schematic cross-sectional view showing a battery using a foil for a negative electrode collector according to first and second embodiments of the present invention.

As shown in FIG. 1, the battery 100 using the negative electrode-collecting foil 5b according to the first embodiment of the present invention is a so-called cylindrical (also called a can type) lithium ion secondary battery. The battery 100 includes a cylindrical housing 1, a lid material 2 with which an opening of the housing 1 is sealed, and a power storage element 3 disposed in the housing 1.

The power storage element 3 and an electrolytic solution (not shown) are housed in the housing 1. The lid material 2 is made of an aluminum alloy or the like, and also serves as a positive electrode terminal (battery positive electrode) of the battery 100. The power storage element 3 is formed with a positive electrode 4, a negative electrode 5, and an insulating separator 6 that is disposed between the positive electrode 4 and the negative electrode 5 such that the positive electrode 4, the negative electrode 5, and the insulating separator 6 are wound. The positive electrode 4 includes a positive electrode active material such as lithium cobalt oxide and a positive electrode collector (positive electrode-collecting foil) that is made of aluminum foil. The positive electrode active material is fixed to a surface of the positive electrode collector (positive electrode-collecting foil) by a binder or the like. In addition, a positive electrode lead material 7 for electrically connecting the lid material 2 and the positive electrode 4 to each other is fixed to the positive electrode 4.

Figure 2:
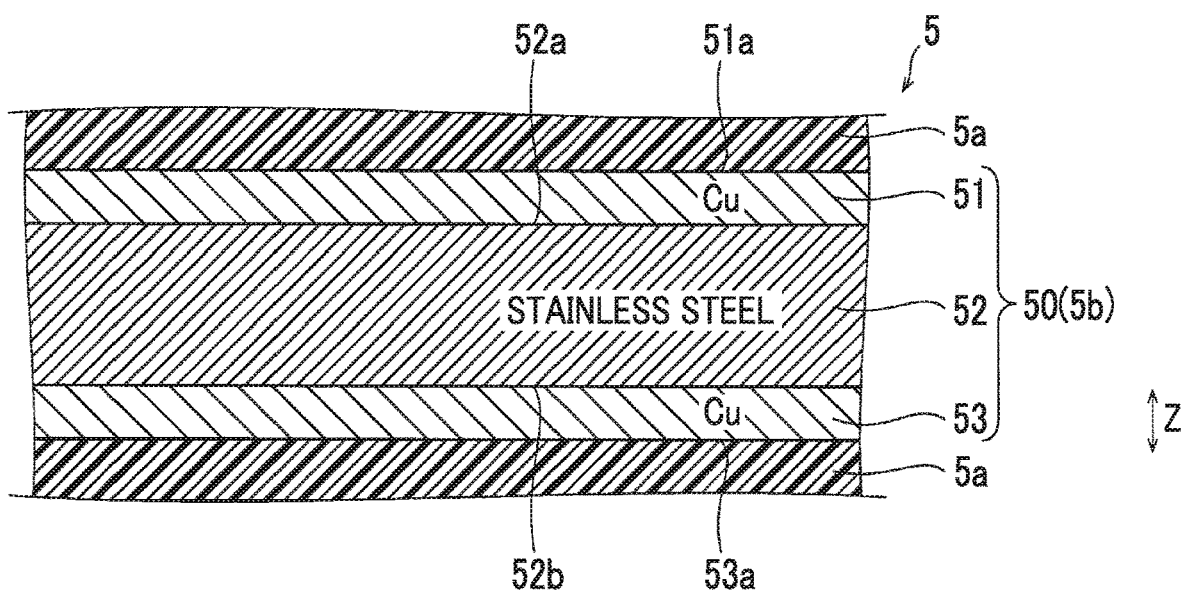
FIG. 2 is a cross-sectional view showing a negative electrode using the foil for a negative electrode collector according to the first embodiment of the present invention.

As shown in FIG. 2, the negative electrode 5 includes negative electrode active materials 5a and a negative electrode collector (hereinafter, referred to as a negative electrode-collecting foil 5b) to which the negative electrode active material 5a is fixed by a binder or the like. Each negative electrode active material 5a is an alloy-based material capable of insertion and desorption of lithium, such as a carbon-based material, Si, or Sn. The alloy-based material has a larger charging and discharging capacity than the carbon-based material, and a high-capacity battery can be obtained by using the alloy-based material. The negative electrode active materials 5a expand and contract in response to the insertion and desorption of lithium, respectively. In addition, as shown in FIG. 1, a negative electrode lead material 8 for electrically connecting an inner bottom surface 1a of the housing 1 and the negative electrode 5 to each other is fixed to the negative electrode 5. The negative electrode-collecting foil 5b corresponds to an example of the "foil for a secondary battery negative electrode collector" in Claims.

(Configuration of Negative Electrode Collector)

Here, in the first embodiment, the negative electrode-collecting foil 5b is a Cu-coating foil 50 made of a clad material and having a total thickness of 200 μm or less. The total thickness is 180 μm or less in order to reduce a size of the battery 100, preferably as small as 160 μm or less, more preferably 50 μm or less, and still more preferably 20 μm or less. The Cu-coating foil 50 includes a first Cu layer 51 made of Cu or a Cu-based alloy, a stainless steel layer 52 made of stainless steel containing Ni, in which a ferrite phase and a martensite phase are present, a second Cu layer 53 made of Cu or a Cu-based alloy, and the first Cu layer 51, the stainless steel layer 52, and the second Cu layer 53 are disposed in this order. At a bonding interface 52a between the stainless steel layer 52 and the first Cu layer 51 and a bonding interface 52b between the stainless steel layer 52 and the second Cu layer 53, metal-to-metal bonding at an atomic level occurs. In addition, the negative electrode active material 5a is fixed, by a binder, to each of a surface 51a of the first Cu layer 51 opposite to a surface of the first Cu layer 51 on which the stainless steel layer 52 is bonded, and a surface 53a of the second Cu layer 53 opposite to a surface of the second Cu layer 53 on which the stainless steel layer 52 is bonded.

Stainless steel used as the core material for forming the stainless steel layer 52 (core material layer) contains Ni of more than 0.6% by mass and 3.0% by mass or less, in which the ferrite phase and the martensite phase are present. The stainless steel in the present invention is intended to have Cr of 10.5% by mass or more and C of 1.2% by mass or less. The stainless steel preferably contains Cr of 10.5% by mass or more and 20% by mass or less, and even more preferably contains 15% by mass or more and 18% by mass or less. Corrosion resistance is improved by containing a large amount of Cr. The stainless steel preferably contains C of 0.3% by mass or less, and even more preferably contains 0.01% by mass or more and 0.2% by mass or less.

The stainless steel exhibits two-phase structure of the ferrite phase and the martensite phase by heat treatment, and is martensitic stainless steel that is easy to finely control a crystal grain size. The martensitic stainless steel is, for example, SUS403, SUS410, or SUS431. SUS431 is preferable since SUS431 has a higher Cr content than SUS403 and is excellent in corrosion resistance. A ratio of the ferrite phase and the martensite phase is preferably 50% or less for the ferrite phase and 50% or more for the martensite phase, and more preferably 45% or less for the ferrite phase and 55% or more for the martensite phase, and even more preferably 40% or less for the ferrite phase and 60% or more for the martensite phase. In order to sufficiently increase a 0.01% proof stress and to sufficiently increase a conductivity, the ferrite phase is preferably 30% or more. That is, in a case where a ratio of the ferrite phase is Gf and a ratio of the martensite phase is Gm, Gf/(Gf+Gm) is preferably 0.3 or more and 0.5 or less. In addition, through experiments (Examples) described below, the present inventor of the present application has confirmed that the stainless steel in which the ferrite phase and the martensite phase are present as the core material is used to have the 0.01% proof stress and the tensile strength near to a case where austenitic stainless is used as a core material.

Cu (material) for forming the first Cu layer 51 and the second Cu layer 53 is, for example, oxygen-free copper containing 99.96% by mass or more of Cu (element), phosphorus-deoxidized copper containing 99.75% by mass or more of Cu, or tough pitch copper containing 99.9% by mass or more of Cu. The Cu-based alloy is, for example, a Cu—Ni alloy, a Cu—Zr alloy, or the like that has a conductivity closer to a conductivity of oxygen-free copper.

Here, in the first embodiment, the 0.01% proof stress of the negative electrode-collecting foil 5b is 500 MPa or more. The 0.01% proof stress of the negative electrode-collecting foil 5b is preferably 550 MPa or more. Here, a stress generated by a volume change due to charging and discharging of the negative electrode active material 5a is applied to the negative electrode-collecting foil 5b. In particular, in a case where an alloy-based material containing Si or Si having a large charging and discharging capacity is used as the negative electrode active material 5a in order to increase capacity of a lithium secondary battery, volume expansion and contraction is large, so that the stress applied to the negative electrode-collecting foil 5b is larger than that of a case where a carbon-based material is used. As a result, since the stress applied to the negative electrode-collecting foil 5b is larger than the proof stress of the negative electrode-collecting foil 5b, the negative electrode-collecting foil 5b is plastically deformed, so that wrinkle-like deformation occurs. Due to the occurrence of the wrinkle-like deformation, the negative electrode active material 5a may be cracked and the negative electrode active material 5a may fall off, resulting in a decrease in battery capacity. Therefore, the negative electrode-collecting foil 5b preferably has a large 0.01% proof stress.

The tensile strength of the negative electrode-collecting foil 5b is preferably 800 MPa or more, more preferably 850 MPa or more, and even more preferably 900 MPa or more. As described above, the stress applied in a case where an alloy-based material having a large charging and discharging capacity is used as the negative electrode active material 5a is larger than the stress applied to the negative electrode-collecting foil 5b in a case where a carbon-based material is used as the negative electrode active material 5a. In a case where the stress applied to the negative electrode-collecting foil 5b is large, the negative electrode-collecting foil 5b is strongly pulled and may be ruptured. Therefore, the tensile strength of the negative electrode-collecting foil 5b is preferably large.

An electrical resistivity of the negative electrode-collecting foil 5b is preferably 7.5 μΩ·cm or less, and more preferably 6 μΩ·cm or less. Therefore, in a case where the electrical resistivity of the negative electrode-collecting foil 5b is 7.5 μΩ·cm or less, the conductivity is 23.0% IACS or more, and in a case where the electrical resistivity of the negative electrode-collecting foil 5b is 6 μΩ·cm or less, the conductivity is 28.7% IACS or more. "the conductivity of the negative electrode-collecting foil 5b is 23.0% IACS or more" means that the conductivity of the negative electrode-collecting foil 5b is 23.0 (=1.7241 (μΩ·cm)/7.5 (μΩ·cm)× 100)% IACS or more in a case where a conductivity of International Annealed Copper Standard with a volume resistivity of 1.7241 μΩ·cm is 100%.

(Step of Producing Negative Electrode-Collecting Foil)

Next, a step of producing the negative electrode-collecting foil 5b according to the first embodiment will be described with reference to FIGS. 2 and 3.

Figure 3:
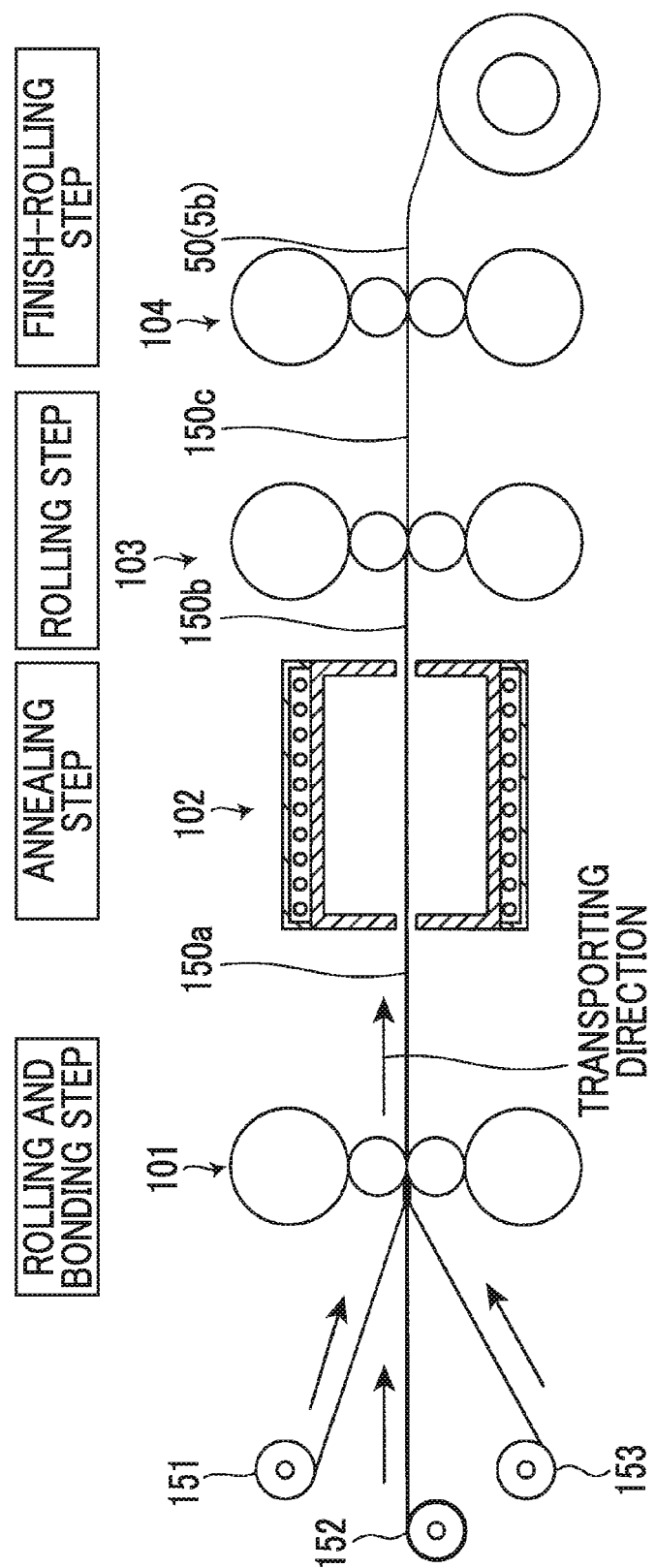
FIG. 3 is a schematic view showing a method of producing the foil for a negative electrode collector according to the first embodiment of the present invention.

First, as shown in FIG. 3, a stainless steel plate material 152 made of stainless steel, and a pair of Cu plate materials 151 and 153 that contain 99% by mass or more of Cu are prepared. The Cu plate material 151 and the Cu plate material 153 may be constituted of Cu plate materials having the same composition, or may be constituted of Cu plate materials having different compositions.

In addition, in a state where the stainless steel plate material 152 is sandwiched between the pair of Cu plate materials 151 and 153 in a thickness direction, rolling and bonding is performed in a cold state (at room temperature, for example, about 20° C. or higher and about 40° C. or lower) using a rolling roll 101. Therefore, a Cu-coating material (Cu-coating foil 150a) in which the pair of Cu plate materials 151 and 153 are bonded to and laminated on both surfaces of the stainless steel plate material 152 is produced. Hereinafter, the Cu-coating material that has been subjected to a rolling and bonding process is referred to as a Cu-coating foil for convenience regardless of the total thickness of the Cu-coating material.

Then, the Cu-coating foil 150a is annealed. Specifically, the Cu-coating foil 150a passes through an annealing furnace 102 in a non-oxidizing atmosphere such as a nitrogen atmosphere. In this case, the Cu-coating foil 150a is disposed in the annealing furnace 102 so as to be held in the annealing furnace 102 that is set at a temperature of 800° C. or higher and 1050° C. or lower for 0.5 minutes or longer and 3 minutes or shorter. The temperature inside the annealing furnace 102 is preferably 850° C. or higher and 1000° C. or lower, and more preferably 950° C. or higher and 1000° C. or lower.

Since the Cu-coating foil 150a is annealed, metal-to-metal bonding at an atomic level is formed at a bonding interface (bonding interface 52a described later) between the stainless steel plate material 152 (stainless steel layer 52 described later) and the Cu plate material 151 (first Cu layer 51 described later) and a bonding interface (bonding interface 52b described later) between the stainless steel plate material 152 (stainless steel layer 52 described later) and the Cu plate material 153 (second Cu layer 53 described later). In addition, due to heat during annealing, some of metal elements constituting the stainless steel plate material 152 (stainless steel layer 52 described later) are diffused to the Cu plate material 151 (first Cu layer 51 described later) and the Cu plate material 153 (second Cu layer 53 described later), and for example, Fe, Cr, and the like are diffused. As a result, a clad material (Cu-coating foil 150b) for obtaining a Cu-coating foil 50 in which the first Cu layer 51 and the second Cu layer 53 are bonded to both surfaces of the stainless steel layer 52 shown in FIG. 2 is produced.

Next, the annealed Cu-coating foil 150b is rolled in a cold state (room temperature) using a rolling roll 103 to produce a Cu-coating foil 150c. Thereafter, the Cu-coating foil 150c is annealed as necessary and then finish-rolled using a rolling roll 104 in a cold state (room temperature) to produce the Cu-coating foil 50 (negative electrode-collecting foil 5b).

In the first embodiment, the negative electrode-collecting foil 5b (Cu-coating foil 50) is continuously produced by a roll-to-roll method as shown in FIG. 3. That is, the roll-shaped negative electrode-collecting foil 5b is produced by using the roll-shaped stainless steel plate material 152, the roll-shaped Cu plate material 151, and the roll-shaped Cu plate material 153.

The roll-shaped negative electrode-collecting foil 5b is cut to have a desired length in a case of being used as the negative electrode-collecting foil of the battery 100.

In the first embodiment, the Cu-coating foil 150b and the Cu-coating foil 150c produced in the process of producing the negative electrode-collecting foil 5b (Cu-coating foil 50) are examples of the "foil for a negative electrode collector" within Claims as long as the foil for a negative electrode collector includes the first Cu layer 51 made of Cu or a Cu-based alloy, the stainless steel layer 52 made of stainless steel containing Ni of more than 0.6% by mass and 3.0% by mass or less, in which a ferrite phase and a martensite phase are present, and the second Cu layer 53 made of Cu or a Cu-based alloy, which are disposed in this order, and a total thickness is 200 μm or less and a 0.01% proof stress is 500 MPa or more.

<Effect of First Embodiment>

In this embodiment, the following effects can be obtained.

In the first embodiment, as described above, the negative electrode-collecting foil 5b includes a first Cu layer 51 made of Cu or a Cu-based alloy, a stainless steel layer 52 made of stainless steel containing Ni of more than 0.6% by mass and 3.0% by mass or less, in which a ferrite phase and a martensite phase are present, and a second Cu layer 53 made of Cu or a Cu-based alloy, which are disposed in this order, and a total thickness is 200 μm or less (still more preferably 20 μm or less) and a 0.01% proof stress is 500 MPa or more. With this configuration, plastic deformation of the negative electrode-collecting foil 5b can be suppressed due to the core material that has a sufficient proof stress while the Ni content contained in the stainless steel constituting the core material of the Cu-coating foil 50 (negative electrode-collecting foil 5b) is reduced. Therefore, since an occurrence of wrinkle-like deformation of the negative electrode-collecting foil 5b can be suppressed while the Ni content contained in the stainless steel constituting the core material of the Cu-coating foil 50 (negative electrode-collecting foil 5b) is reduced even in a case where the stress is repeatedly applied due to expansion and contraction of the negative electrode active material 5a accompanied by charging and discharging, the negative electrode-collecting foil 5b in the first embodiment can be used in the negative electrode collector of the high-capacity battery for which an alloy material such as Si or Sn is used as the negative electrode active material 5a.

In addition, in the first embodiment, the tensile strength of the negative electrode-collecting foil 5b is 800 MPa or more. With this configuration, even in a case where the stress that is applied due to a volume change caused by charging and discharging of the negative electrode active material 5a is large, it is possible to suppress the rupture of the negative electrode-collecting foil 5b. With the synergistic effect caused by a large 0.01% proof stress as described above, the negative electrode-collecting foil can reliably endure the stress due to the volume change of the negative electrode active material 5a, which is caused by charging and discharging in a case where an alloy-based material having a large charging and discharging capacity is used for the negative electrode active material 5a. As a result, since the core material has a sufficient proof stress and a tensile strength while the Ni content contained in the stainless steel constituting the core material of the Cu-coating foil 50 (negative electrode-collecting foil 5b) is reduced, the occurrence of the wrinkle-like deformation of the negative electrode-collecting foil 5b on the negative electrode-collecting foil 5b can be reliably suppressed.

In the first embodiment, an electrical resistivity of the negative electrode-collecting foil 5b is 7.5 $\mu\Omega\cdot$cm or less, and more preferably 6 $\mu\Omega\cdot$cm. With this configuration, since the electrical resistivity is small, it is possible to provide the negative electrode-collecting foil 5b having a large conductivity.

In the first embodiment, the stainless steel layer 52 constituting the core material of the negative electrode-collecting foil 5b contains Cr of 10.5% by mass or more and 20% by mass or less and C of 0.3% by mass or less, more preferably, the stainless steel layer 52 contains Cr of 15% by mass or more and 18% by mass or less and C of 0.01% by mass or more and 0.2% by mass or less, and even more preferably, the stainless steel layer 52 contains Ni of 1.5% by mass or more and 2.5% by mass or less. In this way, since a Cr content contained in the stainless steel layer 52 constituting the core material of the negative electrode-collecting foil 5b is large, corrosion resistance of the core material of the Cu-coating foil 50 (negative electrode-collecting foil 5b) can be improved. In addition, with such a composition, a two-phase structure constituted of a ferrite layer and the martensite phase can be obtained by heat treatment since the stainless steel constituting the core material of the Cu-coating foil 50 (negative electrode-collecting foil 5b) is martensitic stainless steel. As a result, it is possible to finely control a crystal grain size of stainless steel.

In addition, in the first embodiment, the 0.01% proof stress of the negative electrode-collecting foil 5b is preferably 550 MPa or more. With this configuration, even in a case where the stress is repeatedly applied due to expansion and contraction of the negative electrode active material 5a accompanied by charging and discharging, the occurrence of the wrinkle-like deformation on the negative electrode-collecting foil 5b can be reliably suppressed.

In addition, in the first embodiment, the negative electrode-collecting foil 5b is formed of a clad material constituted by the first Cu layer 51, the stainless steel layer 52, and the second Cu layer 53 being laminated and diffusion-bonded in this order. In this way, it is possible to provide the Cu-coating foil 50 (negative electrode-collecting foil 5b) that is formed such that the first Cu layer 51, the second Cu layer 53, and the stainless steel layer 52 are bonded to each other with a strong adhesive force by diffusion-bonding, and that has a thickness of 200 µm or less (still more preferably 20 µm or less) and sufficient conductivity.

Second Embodiment

Figure 4:
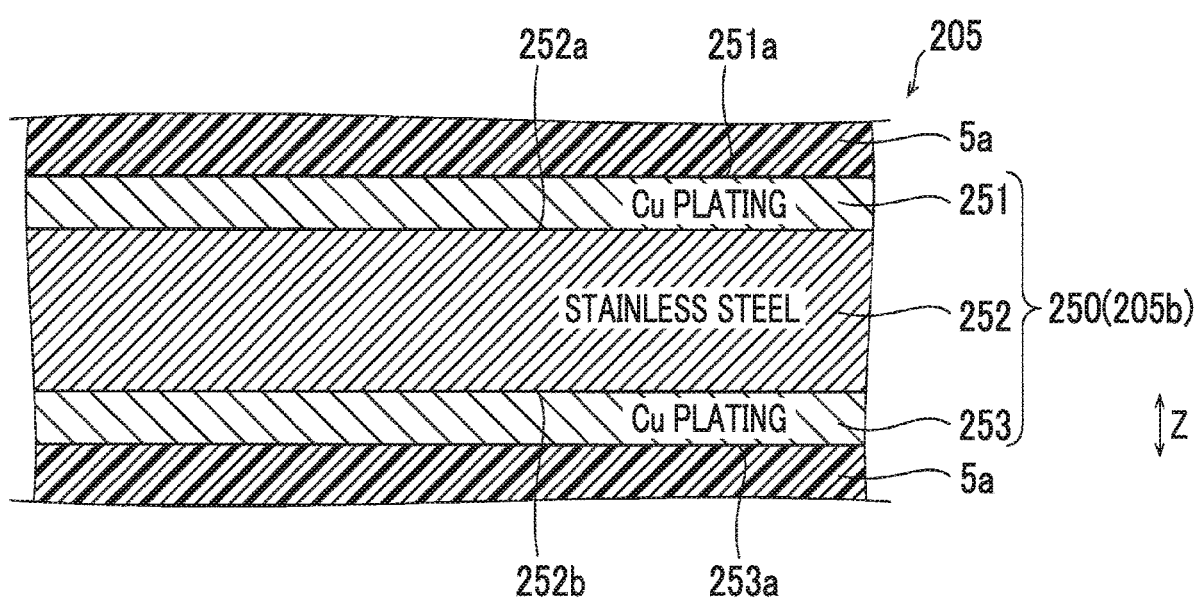
FIG. 4 is a cross-sectional view showing the negative electrode using the foil for a negative electrode collector according to the second embodiment of the present invention.

Next, a negative electrode-collecting foil 205b according to a second embodiment of the present invention will be described with reference to FIGS. 1, 4, and 5. In the second embodiment, an example in which a first Cu plated layer 251 and a second Cu plated layer 253 are used instead of the first Cu layer 51 and the second Cu layer 53 of the negative electrode-collecting foil 5b in the first embodiment will be described. The negative electrode-collecting foil 205b corresponds to an example of the "foil for a secondary battery negative electrode collector" in Claims.

(Battery Structure)

As shown in FIG. 1, a battery 200 using the negative electrode-collecting foil 205b according to the second embodiment of the present invention includes a power storage element 203 including a negative electrode 205. As shown in FIG. 4, the negative electrode 205 includes a negative electrode active material 5a and a negative electrode-collecting foil 205b.

(Configuration of Negative Electrode Collector)

Here, in the second embodiment, the negative electrode-collecting foil 205b has a three-layer structure. The negative electrode-collecting foil 205b is a Cu-coating foil 250 including a stainless steel layer 252 made of stainless steel, a first Cu plated layer 251, and a second Cu plated layer 253, in which the first Cu plated layer 251 and the second Cu plated layer 253 are plated on a surface 252a and a surface 252b, respectively, in a thickness direction (Z direction) of the stainless steel layer 252. In addition, the negative electrode active material 5a is fixed to each of a surface 251a of the first Cu plated layer 251 opposite to a surface of the first Cu plated layer 251 on which the stainless steel layer 252 is disposed, and a surface 253a of the second Cu plated layer 253 opposite to a surface of the second Cu plated layer 253 on which the stainless steel layer 52 is disposed. Each of the first Cu plated layer 251 and the second Cu plated layer 253 corresponds to each of examples of the "first Cu layer" and the "second Cu layer" in Claims.

The first Cu plated layer 251 and the second Cu plated layer 253 are mainly made of Cu (copper). The first Cu plated layer 251 and the second Cu plated layer 253 contain some of the metal elements constituting the stainless steel layer 252. In annealing described later, some of the metal elements diffuse from the stainless steel layer 252 to the first Cu plated layer 251 and the second Cu plated layer 253, so that the first Cu plated layer 251 and the second Cu plated layer 253 are mainly included in a region on the stainless steel layer 252 side. An underlayer (Ni plated layer or the like) may be provided on the stainless steel layer 252, and the first Cu plated layer 251 and the second Cu plated layer 253 may be provided on the underlayer. Therefore, it possible to improve adhesiveness between the stainless steel layer 252 and the first Cu plated layer 251 and second Cu plated layer 253.

Here, in the second embodiment, the 0.01% proof stress of the negative electrode-collecting foil 205b is 500 MPa or more. The 0.01% proof stress of the negative electrode-collecting foil 205b is preferably 550 MPa or more. Stress generated by a volume change due to charging and discharging of the negative electrode active material 5a is applied to the negative electrode-collecting foil 205b, similar to the first embodiment. In particular, the stress applied in a case where an alloy-based material having a large charging and discharging capacity is used as the negative electrode active material 5a in order to increase capacity of a lithium secondary battery is larger than that of a case where a carbon-based material is used as the negative electrode active material 5a, so that wrinkle-like deformation can highly occur on the negative electrode-collecting foil 205b.

Therefore, the negative electrode-collecting foil 205b preferably has a large 0.01% proof stress.

The tensile strength of the negative electrode-collecting foil 205b is preferably 800 MPa or more, more preferably 850 MPa or more, and even more preferably 900 MPa or more. As described above, the stress applied in a case where an alloy-based material having a large charging and discharging capacity is used as the negative electrode active material 5a is larger than the stress in a case where a carbon-based material is used as the negative electrode active material 5a. In a case where the stress applied to the negative electrode-collecting foil 205b is large, the negative electrode-collecting foil 205b is strongly pulled and may be ruptured. Therefore, it is preferable to have a large tensile strength of the negative electrode-collecting foil 205b.

An electrical resistivity of the negative electrode-collecting foil 205b is preferably 7.5 μΩ·cm or less, and more preferably 6 μΩ·cm or less. Therefore, in a case where the electrical resistivity of the negative electrode-collecting foil 205b is 7.5 μΩ·cm or less, the conductivity is 23.0% IACS or more, and in a case where the electrical resistivity of the negative electrode-collecting foil 205b is 6 μΩ·cm or less, the conductivity is 28.7% IACS or more. "the conductivity of the negative electrode-collecting foil 205b is 23.0% IACS or more" means that the conductivity of the negative electrode-collecting foil 205b is 23.0 (=1.7241 (μΩ·cm)/7.5 (μΩ·cm)×100)% IACS or more in a case where a conductivity of International Annealed Copper Standard with a volume resistivity of 1.7241 μΩ·cm is 100%. Other configurations of the second embodiment are the same as those of the first embodiment.

(Step of Producing Negative Electrode-Collecting Foil)

Next, a step of producing the negative electrode-collecting foil 205b according to the second embodiment will be described with reference to FIGS. 4 and 5.

Figure 5:
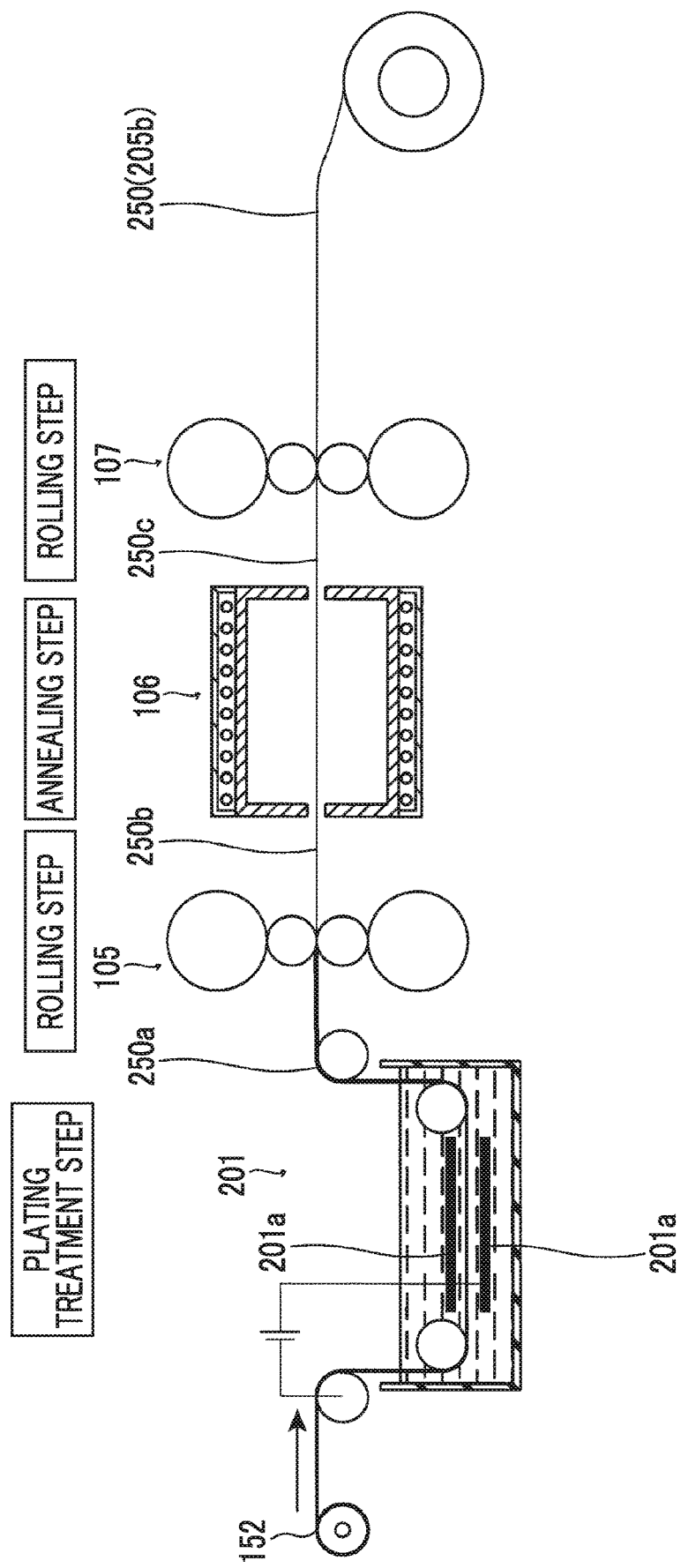
FIG. 5 is a schematic view showing a method of producing the foil for a negative electrode collector according to the second embodiment of the present invention.

First, as shown in FIG. 5, a stainless steel plate material 152 made of stainless steel is prepared. By performing plating treatment on the stainless steel plate material 152, a Cu-coating foil 250a is produced such that a pair of the first Cu plated layer 251 and the second Cu plated layer 253 (see FIG. 4) is formed and laminated on both surfaces of the stainless steel plate material 152 (stainless steel layer 252 described later), respectively.

Specifically, the first Cu plated layer 251 and the second Cu plated layer 253 are produced such that the stainless steel plate material 152 passes through the inside of an electroplating bath 201. In the electroplating bath 201, a plating solution (for example, a copper sulfate aqueous solution) and Cu plate materials 201a that are disposed in the plating solution and configured to be anodes by connecting electrodes at appropriate positions are disposed. Then, in a state where the stainless steel plate material 152 is configured to serve as a cathode, copper ions in the plating solution are applied to both surfaces of the stainless steel plate material 152 by allowing energization between the stainless steel plate material 152 and the Cu plate materials 201a, so that the copper ions in the plating solution precipitates on both surfaces of the stainless steel plate material 152 as copper to form a Cu coating film. In this Cu coating film, the copper ions gradually dissolve in the plating solution from the Cu plate materials 201a and precipitate on both surfaces of the stainless steel plate material 152, so that the copper ions eventually grow into the first Cu plated layer 251 and the second Cu plated layer 253. In this way, a pair of the first Cu plated layer 251 and the second Cu plating 253 are formed on both surfaces of the stainless steel plate material 152, respectively, and the first Cu plated layer 251, the stainless steel plate material 152 (stainless steel layer 252 described later), and the second Cu plating 253 are disposed in this order to produce the Cu-coating foil 250a. Although not shown in FIG. 5, at least the stainless steel plate material 152 is washed before plating, and at least the Cu-coating foil 250a is washed and dried after plating.

Thereafter, the Cu-coating foil 250a is rolled using a rolling roll 105 in a cold state (room temperature, for example, about 20° C. or higher and about 40° C. or lower) to produce a Cu-coating foil 250b.

Then, the Cu-coating foil 250b is annealed using an annealing furnace 106 in the same manner as in the annealing of the first embodiment. Therefore, a Cu-coating foil 250c in which the first Cu plated layer 251 and the second Cu plated layer 253 that have been annealed are disposed on both surfaces of the stainless steel layer 252 made of the stainless steel plate material 152, respectively, is produced.

On the other hand, in the Cu-coating foil 250c that has been annealed in the same manner as the annealing of the first embodiment, some of the metal elements of the stainless steel plate material 152 constituting the stainless steel layer 52 diffuse into the first Cu plated layer 251 and the second Cu plated layer 253 by heat during annealing.

Then, the Cu-coating foil 250c that has been annealed is rolled using a rolling roll 107 in a cold state (room temperature) in the same manner as in the first embodiment to produce a Cu-coating foil 250 (negative electrode-collecting foil 205b) having a thickness of 200 μm or less.

In the second embodiment, the negative electrode-collecting foil 205b (Cu-coating foil 250) is continuously produced by a roll-to-roll method as shown in FIG. 5. That is, the roll-shaped stainless steel plate material 152 is used to produce the roll-shaped negative electrode-collecting foil 205b. The electroplating bath 201 is an electroplating bath device for so-called hoop plating, and the annealing furnace 106 is a continuous furnace. The roll-shaped negative electrode-collecting foil 205b is cut to have a desired length in a case of being used as the negative electrode-collecting foil 205b of the battery 200.

In the second embodiment, the Cu-coating foil 250a, the Cu-coating foil 250b, and the Cu-coating foil 250c produced in the process of producing the negative electrode-collecting foil 205b (Cu-coating foil 250) are examples of the "foil for a negative electrode collector" within Claims as long as the foil for a negative electrode collector includes the first Cu plated layer 251 made of Cu or a Cu-based alloy, the stainless steel layer 252 made of stainless steel containing Ni of more than 0.6% by mass and 3.0% by mass or less, in which a ferrite phase and a martensite phase are present, or the stainless steel plate material 152 constituting the stainless steel layer 252, and the second Cu plated layer 253 made of Cu or a Cu-based alloy, which are disposed in this order, and a total thickness is 200 μm or less and a 0.01% proof stress is 500 MPa or more.

<Effect of Second Embodiment>

In the second embodiment, the following effects can be obtained.

In the second embodiment, the Ni content contained in the stainless steel constituting the core material of the negative electrode-collecting foil 205b is more than 0.6% by mass and 3.0% by mass or less, and the negative electrode-collecting foil 205b has a 0.01% proof stress of 500 MPa or more. With this configuration, even in a case where a stress applied to the negative electrode-collecting foil 205b increases, plastic deformation of the negative electrode-collecting foil 205b can be suppressed due to the core material that has a sufficient proof stress while the Ni content contained in the stainless steel constituting the core material of the negative electrode-collecting foil 205b is reduced. Therefore, since an occurrence of wrinkle-like deformation of the negative electrode-collecting foil 205b can be suppressed while the Ni content contained in the stainless steel constituting the core material of the negative electrode-collecting foil 205b is reduced even in a case where the stress is repeatedly applied due to expansion and contraction of the negative electrode active material 205a accompanied by charging and discharging, the negative electrode-collecting foil 205b in the second embodiment can be used in the negative electrode collector of the high-capacity battery for which an alloy material such as Si or Sn is used as the negative electrode active material 5a.

In the second embodiment, the negative electrode-collecting foil 205b includes a first Cu plated layer 251 and a second Cu plated layer 253. With this configuration, since a thickness of the Cu plated layers can be easily reduced, it is possible to easily form the foil for a secondary battery negative electrode collector having a thickness of 200 μm or less (still more preferably 20 μm or less) and sufficient conductivity. Other effects of the second embodiment are the same as the effects of the first embodiment.

EXAMPLES

Next, an experiment conducted to confirm the effects of the first embodiment will be described.

(Production of Cu-Coating Foil of Example 1)

Based on a manufacturing method of the first embodiment, a Cu-coating foil 150c of Example 1 was produced. Specifically, a stainless steel plate material 152 made of stainless steel containing 0.07% by mass of C, 0.50% by mass of Si, 0.3% by mass of Mn, 2.0% by mass of Ni, and 16.3% by mass of Cr (a SUS431 equivalent material of JIS standard), and a pair of Cu plate materials 151 and 153 made of oxygen-free copper of C1020 (based on JIS H 0500) were prepared. A thickness of the prepared stainless steel plate material 152 is 1 mm, and a thickness of each of the pair of Cu plate materials 151 and 153 is 0.33 mm. A thickness ratio (Cu1:SUS:Cu2) of the Cu plate material 151, the stainless steel plate material 152, and the Cu plate material 153 is 1:3:1.

In a state where the stainless steel plate material 152 was sandwiched between the pair of Cu plate materials 151 and 153 in the thickness direction, the stainless steel plate material 152 was subjected to rolling and bonding in a cold state (room temperature) using the rolling roll 103. Therefore, the pair of Cu plate materials 151 and 153 were bonded to both surfaces of the stainless steel plate material 152, respectively, to produce the Cu-coating foil 150a having a total thickness of 0.8 mm. Then, the rolled Cu-coating foil 150a was annealed at 800° C. to produce the Cu-coating foil 150b.

In addition, the annealed Cu-coating foil 150b was rolled in a cold state (room temperature) using the rolling roll 103 to produce the Cu-coating foil 150c having a total thickness of 0.16 mm. Thereafter, the Cu-coating foil 150c was annealed as necessary and then, as shown in FIG. 3, finish-rolled, so that the following Cu-coating foil 50 (negative electrode-collecting foil 5b) having the total thickness of 20 μm or less was formed from the Cu-coating foil 150c having the total thickness of 0.16 mm. The reliability of various measurements and evaluations based on the results thereof is improved by using the Cu-coating foil 150c before finish-rolling, which has a larger total thickness than the Cu-coating foil 50 after finish-rolling, which has a smaller total thickness. This point also applies to the following Examples and Comparative Examples. The thickness ratio (Cu1:SUS:Cu2) of the first Cu layer 51, the stainless steel layer 52, and the second Cu layer 53 constituting the Cu-coating foil 150c was 1:3:1. A ratio of crystal phases of the stainless steel constituting the core material of the Cu-coating foil 150c is based on the analysis using EPMA described later.

(Production of Cu-Coating Foil of Example 2)

Based on the manufacturing method of the first embodiment, a Cu-coating foil 150c of Example 2 was produced. Specifically, a stainless steel plate material 152 made of stainless steel containing 0.07% by mass of C, 0.50% by mass of Si, 0.3% by mass of Mn, 2.0% by mass of Ni, and 16.3% by mass of Cr (a SUS431 equivalent material of JIS standard), and a pair of Cu plate materials 151 and 153 made of oxygen-free copper of C1020 (based on JIS H 0500) were prepared. A thickness of the stainless steel plate material 152 is 1 mm, and a thickness of each of the pair of Cu plate materials 151 and 153 is 0.3 mm.

In a state where the stainless steel plate material 152 was sandwiched between the pair of Cu plate materials 151 and 153 in the thickness direction, the stainless steel plate material 152 was subjected to rolling and bonding in a cold state (room temperature) using the rolling roll 101. Therefore, the pair of Cu plate materials 151 and 153 were bonded to both surfaces of the stainless steel plate material 152, respectively, to produce the Cu-coating foil 150a having a total thickness of 0.8 mm. Then, the rolled Cu-coating foil 150a was annealed at 1000° C. to produce the Cu-coating foil 150b.

In addition, the produced Cu-coating foil 150b was rolled in a cold state (room temperature) using the rolling roll 103 to produce the Cu-coating foil 150c having a total thickness of 0.16 mm. The thickness ratio (Cu1:SUS:Cu2) of the first Cu layer 51, the stainless steel layer 52, and the second Cu layer 53 constituting the Cu-coating foil 150c was 3:10:3. A ratio of crystal phases of the stainless steel constituting the core material of the Cu-coating foil 150c is based on the analysis using EPMA described later.

(Production of Cu-Coating Foil of Comparative Example 1)

Based on the manufacturing method of the first embodiment, a Cu-coating foil 150c of Comparative Example 1 was produced. Specifically, the Cu-coating foil 150c having a total thickness of 0.16 mm of Comparative Example 1 was produced in the same manner as the Cu-coating foil 150c of Example 1, except that the stainless steel plate material 152 made of stainless steel containing 0.07% by mass of C, 0.50% by mass of Si, 0.3% by mass of Mn, 18% by mass of Cr, and no Ni (a SUS430 equivalent material of JIS standard) was used. The thickness ratio (Cu1:SUS:Cu2) of the first Cu layer 51, the stainless steel layer 52, and the second Cu layer 53 constituting the Cu-coating foil 150c was 1:3:1. A ratio of crystal phases of the stainless steel constituting the core material of the Cu-coating foil 150c is based on the analysis using EPMA described later.

(Production of Cu-Coating Foil of Comparative Example 2)

Based on the manufacturing method of the first embodiment, a Cu-coating foil 150c of Comparative Example 2 was produced. Specifically, the Cu-coating foil 150c having a total thickness of 0.16 mm of Comparative Example 2 was produced in the same manner as the Cu-coating foil 150c of Example 1, except that the stainless steel plate material 152 made of stainless steel containing 0.07% by mass of C, 0.50% by mass of Si, 0.3% by mass of Mn, 7% by mass of Ni, and 17% by mass of Cr (a SUS304 equivalent material of JIS standard) was used, and an annealing temperature was set to 1050° C. The thickness ratio (Cu1:SUS:Cu2) of the first Cu layer 51, the stainless steel layer 52, and the second Cu layer 53 constituting the Cu-coating foil 150c was 1:3:1. The crystal phases of the stainless steel constituting the core material of the Cu-coating foil 150c is based on the analysis using EPMA described later.

A tensile strength, a 0.01% proof stress, and an electrical resistivity of each of Example 1, Example 2, Comparative Example 1, and Comparative Example 2 produced as described above were measured. The conductivity IACS was calculated based on a value of each electrical resistivity. The tensile strength was measured by a tensile test based on JIS Z 2241. The 0.01% proof stress is a stress value corresponding to a position at which a strain is 0.01% in a stress-strain curve (graph) obtained by the tensile test. The electrical resistivity was measured based on JIS C 2525. The ratio of crystal phases (see Table 1) is an area ratio between a high concentration region of Cr and a high concentration region of Ni, which is obtained such that a mapping analysis for Cr and Ni using EPMA (Electron Probe Micro Analyzer) is performed with respect to a structure of stainless steel, and the high concentration region of Cr is regarded as a ferrite phase and the high concentration region of Ni is regarded as a martensite phase.

(Measurement Result)

Measurement results of produced Example 1, Example 2, Comparative Example 1, and Comparative Example 2 are shown in Table 1, respectively.

Example 2, the tensile strength increased by about 1.23 times, the 0.01% proof stress increased by about 1.18 times, the electrical resistivity increased by about 1.13 times, the conductivity increased by about 0.89 times, and the area ratio of the martensite phase increased by about 1.12 times. From this result, it was found that even in a case where the same SUS431 equivalent materials were used as the stainless steel constituting the stainless steel plate material 152, an increase or decrease in mechanical strength and electrical characteristics could be controlled, and due to the large area ratio of the martensite phase, the mechanical strength tended to increase and the electrical characteristics tended to slightly decrease.

In addition, in Comparative Example 1, a ferritic SUS430 equivalent material used for general purposes was used as the stainless steel constituting the stainless steel plate material 152 and annealed at an annealing temperature of 800° C., and a tensile strength was 627 MPa, a 0.01% proof stress was 396 MPa, an electrical resistivity was 4.7 μΩ·cm, and a conductivity was 37% IACS. In Comparative Example 1, a crystal phase of the core material made of stainless steel had an area ratio of a ferrite layer occupying 100%, and no martensite phase was confirmed.

In a case of comparing Comparative Example 1 with Example 1 with respect to the mechanical strength, in Comparative Example 1, the tensile strength increased by about 0.70 times, the 0.01% proof stress increased by about 0.67 times, and both the tensile strength and the 0.01% proof stress of Comparative Example 1 were inferior to those of

TABLE 1

| | Ni content (% by mass) | Annealing temperature (° C.) | Ratio of crystal phase (%) | Tensile strength (MPa) | 0.01% proof stress (MPa) | Electrical resistivity (μΩ · cm) | Conductivity IACS (%) |
|---|---|---|---|---|---|---|---|
| Example 1 | 2 | 800 | Ferrite: 43 Martensite: 57 | 902 | 591 | 4.8 | 36 |
| Example 2 | 2 | 1000 | Ferrite: 36 Martensite: 64 | 1109 | 700 | 5.4 | 32 |
| Comparative Example 1 | 0 | 800 | Ferrite: 100 | 627 | 396 | 4.7 | 37 |
| Comparative Example 2 | 7 | 1050 | Austenite: 59 Martensite: 41 | 1132 | 653 | 5.6 | 31 |

In Example 1, a SUS431 equivalent material was used as the stainless steel constituting the stainless steel plate material 152 and annealed at an annealing temperature of 800° C., and a tensile strength was 902 MPa, a 0.01% proof stress was 591 MPa, an electrical resistivity was 4.8 μΩ·cm, and a conductivity was 36% IACS. In Example 1, a crystal phase of the core material made of stainless steel had an area ratio of the ferrite phase occupying 43% and an area ratio of the martensite phase occupying 57%.

In addition, in Example 2, a SUS431 equivalent material was used in the same manner as in Example 1 and annealed at an annealing temperature of 1000° C., and a tensile strength was 1109 MPa, a 0.01% proof stress was 700 MPa, an electrical resistivity was 5.4 μΩ·cm, and a conductivity was 32% IACS. In Example 2, a crystal phase of the core material made of stainless steel had an area ratio of the ferrite phase occupying 36% and an area ratio of the martensite phase occupying 64%.

In a case of comparing Example 1 with Example 2, even though the same SUS431 equivalent materials were used, in Example 1. In addition, in a case of comparing Comparative Example 1 with Example 2, in Comparative Example 1, the tensile strength increased by about 0.57 times, the 0.01% proof stress increased by about 0.53 times, and both the tensile strength and the 0.01% proof stress of Comparative Example 1 were inferior to those of Example 2.

In a case of comparing Comparative Example 1 with Example 1 with respect to the electrical characteristics, in Comparative Example 1, the electrical resistivity increased by about 0.98 times, the conductivity increased by about 1.03 times, and both the electrical resistivity and the conductivity of Comparative Example 1 were the same as those of Example 1. In addition, in a case of comparing Comparative Example 1 with Example 2, the electrical resistivity increased by about 0.87 times, the conductivity increased by about 1.16 times, and both the electrical resistivity and the conductivity of Comparative Example 1 were superior to those of Example 2.

In addition, in Comparative Example 2, an austenitic SUS304 equivalent material used for general purposes was used as the stainless steel constituting the stainless steel plate material 152 and annealed at an annealing temperature of 1050° C., and a tensile strength was 1132 MPa, a 0.01% proof stress was 653 MPa, an electrical resistivity was 5.6 μΩ·cm, and a conductivity was 31% IACS. In Comparative Example 2, although a crystal phase of the core material made of stainless steel had an area ratio of the austenite phase occupying 59% and an area ratio of the martensite phase occupying 41%, no ferrite phase was confirmed.

In a case of comparing Comparative Example 2 with Example 1 with respect to the mechanical strength, in Comparative Example 2, the tensile strength increased by about 1.25 times, the 0.01% proof stress increased by about 1.10 times, and both the tensile strength and the 0.01% proof stress of Comparative Example 2 were superior to those of Example 1. In addition, in a case of comparing Comparative Example 2 with Example 2, in Comparative Example 2, the tensile strength increased by about 1.02 times, and the 0.01% proof stress increased by about 0.93 times, the tensile strength of Comparative Example 2 was the same as that of Example 2, but the 0.01% proof stress of Comparative Example 2 was inferior to that of Example 2.

In a case of comparing Comparative Example 2 with Example 1 with respect to the electrical characteristics, in Comparative Example 2, the electrical resistivity increased by about 1.17 times, the conductivity increased by about 0.86 times, and both the electrical resistivity and the conductivity of Comparative Example 2 were inferior to those of Example 1. In addition, in a case of comparing Comparative Example 2 with Example 2, the electrical resistivity increased by about 1.04 times, the conductivity increased by about 0.97 times, and both the electrical resistivity and the conductivity of Comparative Example 2 were the same as those of Example 2 or inferior to those of Example 2.

From the above results, it was found that both Example and Example 2 exemplified as the embodiments of the present invention had a preferable electrical resistivity of 7.5 μΩ·cm or less, and a 0.01% proof stress of 500 MPa or more that is sufficient for use as the negative electrode collector (negative electrode-collecting foil) of the high-capacity battery. Therefore, it was found that the Cu-coating foil (the foil for a negative electrode collector) having a total thickness of 200 μm or less, which includes Example 1 and Example 2 exemplified in the embodiments of the present invention, was suitable as the foil for a negative electrode collector of the high-capacity battery from the viewpoint that wrinkle-like deformation of the negative electrode collector (negative electrode-collecting foil) can be suppressed by having a 0.01% proof stress of 500 MPa or more.

It was found that in a case where the electrical characteristics (electrical resistivity and conductivity) of the negative electrode collector of the high-capacity battery were more important, the Cu-coating foil (the foil for a negative electrode collector) having the configuration as in Example 1 was suitable. In addition, it was found that in a case where the mechanical strength (tensile strength and 0.01% proof stress) of the negative electrode collector of the high-capacity battery was more important, the Cu-coating foil (the foil for a negative electrode collector) having the configuration as in Example 2 was suitable.

From the above results of Example 1 and Example 2, it was found that the ratio of crystal phases of the core material constituted of stainless steel, that is, the area ratio of the ferrite phase to martensite phase was changed by changing the annealing temperature, and the area ratio of the martensite phase could be increased. It was also found that it was possible to increase the area ratio of the martensite phase by increasing the annealing temperature, appropriately. Here, the Cu-coating foil (the foil for a negative electrode collector) constituting the negative electrode collector of the high-capacity battery preferably has a relatively large 0.01% proof stress (Example 2) and a relatively large conductivity (Example 1). From this viewpoint, the ratio of the crystal phases in the Cu-coating foil (the foil for a negative electrode collector) is within a range including both Example 1 and Example 2, specifically, in a case where a ratio of the ferrite phase is Gf and a ratio of the martensite phase is Gm, Gf/(Gf+Gm) is preferably 0.3 or more and 0.5 or less. From the results of Example 1 and Example 2 in which Ni is 2% by mass and Comparative Example 2 in which Ni is 7% by mass, in a case where the Ni content contained in the stainless steel constituting the core material of the Cu-coating foil (the foil for a negative electrode collector), the area ratio of the martensite phase decreased. In Comparative Example 2, the ratio of the martensite phase (41%) is smaller than the ratio of the austenite phase (59%), but this martensite phase is formed by changing a part of the austenite phase due to processing induction.

From the above viewpoint, it was found that the martensite phase is increased by an increase in the annealing temperature, so that a 0.01% proof stress and a tensile strength could be increased. In addition, it was found that in a case where the area ratio of the martensite phase reaches an increased limit, a sufficient tensile strength and a 0.01% proof stress could be obtained by increasing the Ni content within a predetermined range. From the viewpoint of performing the annealing, it is considered that the structure of stainless steel (martensite phase) can be strengthen by dissolving C present in the structure of stainless steel to increase the C concentration of the martensite phase. On the other hand, it is considered that in a case where the annealing temperature is excessively lowered, not only the area ratio of the martensite phase in the structure of the stainless steel decreases, but also C in the structure of the stainless steel is present as a carbide, so that the C concentration of the martensite phase relatively decreases, and the stainless steel structure (martensite phase) may be weakened.

Modification Example

The embodiments and Examples disclosed herein are considered as exemplary examples and are not restrictive in all respects. The scope of the present invention is shown by the scope of Claims rather than the description of the above described embodiments and Examples, and further includes all modifications (Modification Examples) within the meaning and scope equivalent to the scope of Claims.

For example, in the first embodiment, the example in which the negative electrode-collecting foil 5b formed of the Cu-coating foil 50 (the foil for a secondary battery negative electrode collector) is applied to a lithium ion secondary battery (the battery 100) is illustrated, and in the second embodiment, the example in which the negative electrode-collecting foil 205b formed of the Cu-coating foil 250 (the foil for a secondary battery negative electrode collector) is applied to a lithium ion secondary battery (the battery 200), but the present invention is not limited thereto. In the present invention, the negative electrode-collecting foil formed of the secondary battery negative electrode-collecting foil may be applied to a secondary battery other than the lithium ion secondary battery. For example, the negative electrode-collecting foil may be applied to a sodium ion secondary battery, a magnesium secondary battery, or the like.

For example, in the first embodiment and the second embodiment, the example in which the negative electrode-collecting foil 5b formed of the Cu-coating foil 50 (the foil for a secondary battery negative electrode collector) is applied to a lithium ion secondary battery (the battery 100) is illustrated, and in the second embodiment, the example in which the negative electrode-collecting foil 205b formed of the Cu-coating foil 250 (the foil for a secondary battery negative electrode collector) is applied to a lithium ion secondary battery (the battery 200), but the present invention is not limited thereto. The present invention may be a so-called laminated lithium ion secondary battery.

In addition, in the first embodiment, the example in which the Cu-coating foil 50 formed of the clad material including the three-layer structure of the Cu layer, the stainless steel layer, and the Cu layer is used as the negative electrode-collecting foil 5b is illustrated, and in the second embodiment, the example in which the Cu-coating foil 250 including the three-layer structure of the Cu plated layer, the stainless steel layer, and the Cu plated layer is used as the negative electrode-collecting foil 205b is also illustrated, but the present invention is not limited thereto. In the present invention, the negative electrode-collecting foil (Cu-coating foil) is not limited to the three-layer structure. For example, a metal layer that suppresses oxidation of the Cu layer (or Cu plated layer) may be formed on a surface opposite to a surface of the stainless steel layer on which the Cu layer or the Cu plated layer of the clad material is disposed. As described in the second embodiment, an underlayer having a small thickness may be disposed between the Cu plated layer and the stainless steel layer. This underlayer can also be applied to the Cu-coating foil made of the clad material obtained by rolling. In this case, the thickness of the foil for a negative electrode collector having a four-layer structure or more is preferably 20 μm or less.

In the second embodiment, the example in which the pair of Cu plated layers 251 and 253 are formed on both surfaces of the stainless steel plate material 152 (the stainless steel layer 52 described later), respectively, through the electroplating bath 201 as electrolytic plating treatment, but the present invention is not limited thereto. In the present invention, a pair of Cu plated layers may be formed on both surfaces of the stainless steel layer, respectively, by electroless plating.

In addition, in the first and second embodiments, the example in which the first Cu layer 51 and the second Cu layer 53 (Cu plated layers 251 and 253) are mainly made of Cu (copper) is illustrated, but the present invention is not limited thereto. In the present invention, the pair of Cu plate materials 151 and 153 for producing the first Cu layer 51 and the second Cu layer 53 may be made of a Cu-based alloy, or the Cu plate material 201a for forming the Cu plated layers 251 and 253 may be made of a Cu-based alloy.

REFERENCE SIGNS LIST 5a negative electrode active material
5b, 205b negative electrode-collecting foil (foil for secondary battery negative electrode collector)
52 stainless steel layer
51 first Cu layer
52 second Cu layer
251 first Cu plated layer (first Cu layer)
253 second Cu plated layer (second Cu layer)

The invention claimed is:

1. A foil for a secondary battery negative electrode collector comprising, in the following order:
   a first Cu layer (51) made of Cu or a Cu-based alloy;
   a stainless steel layer (52) made of stainless steel containing Ni of more than 1.5% by mass and 2.5% by mass or less, in which a ferrite phase and a martensite phase are present; and
   a second Cu layer (53) made of Cu or a Cu-based alloy, wherein a total thickness is 200 μm or less and a 0.01% proof stress is 500 MPa or more.

2. The foil for a secondary battery negative electrode collector according to claim 1, wherein a tensile strength is 800 MPa or more.

3. The foil for a secondary battery negative electrode collector according to claim 1, wherein an electrical resistivity is 7.5 μΩ·cm or less.

4. The foil for a secondary battery negative electrode collector according to claim 1, wherein the stainless steel layer contains Cr of 10.5% by mass or more and 20% by mass or less and C of 0.3% by mass or less.

5. The foil for a secondary battery negative electrode collector according to claim 1, wherein the stainless steel layer contains Cr of 15% by mass or more and 18% by mass or less and C of 0.01% by mass or more and 0.2% by mass or less.

6. The foil for a secondary battery negative electrode collector according to claim 1, wherein the stainless steel layer contains Ni of 2% by mass.

7. The foil for a secondary battery negative electrode collector according to claim 1, wherein the 0.01% proof stress is 550 MPa or more.

8. The foil for a secondary battery negative electrode collector according to claim 1, which is formed of a clad material constituted by the first Cu layer, the stainless steel layer, and the second Cu layer being laminated and diffusion-bonded in this order.

9. The foil for a secondary battery negative electrode collector according to claim 1, wherein each of the first Cu layer and the second Cu layer is a plated layer.

10. The foil for a secondary battery negative electrode collector according to claim 6, wherein a tensile strength is 800 MPa or more.

11. The foil for a secondary battery negative electrode collector according to claim 6, wherein an electrical resistivity is 7.5 μΩ·cm or less.

12. The foil for a secondary battery negative electrode collector according to claim 6, wherein the stainless steel layer contains Cr of 10.5% by mass or more and 20% by mass or less and C of 0.3% by mass or less.

13. The foil for a secondary battery negative electrode collector according to claim 6, wherein the stainless steel layer contains Cr of 15% by mass or more and 18% by mass or less and C of 0.01% by mass or more and 0.2% by mass or less.

14. The foil for a secondary battery negative electrode collector according to claim 6, wherein the 0.01% proof stress is 550 MPa or more.

15. The foil for a secondary battery negative electrode collector according to claim 6, which is formed of a clad material constituted by the first Cu layer, the stainless steel layer, and the second Cu layer being laminated and diffusion-bonded in this order.

16. The foil for a secondary battery negative electrode collector according to claim 6, wherein each of the first Cu layer and the second Cu layer is a plated layer.

17. The foil for a secondary battery negative electrode collector according to claim 1, wherein the stainless steel layer contains Ni of 2.0% by mass or more and 2.5% by mass or less.

18. The foil for a secondary battery negative electrode collector according to claim 1, wherein the stainless steel layer contains Ni of 1.5% by mass or more and 2.0% by mass or less.

19. The foil for a secondary battery negative electrode collector according to claim 17, wherein a tensile strength is 800 MPa or more.

20. The foil for a secondary battery negative electrode collector according to claim 18, wherein a tensile strength is 800 MPa or more.

* * * * *